(12) United States Patent
Suh et al.

(10) Patent No.: US 11,458,848 B2
(45) Date of Patent: Oct. 4, 2022

(54) FUEL CELL VEHICLE

(71) Applicants: Hyundai Motor Company, Seoul (KR); Kia Motors Corporation, Seoul (KR)

(72) Inventors: Jung Do Suh, Seoul (KR); Seung Jun Yeon, Yongin-si (KR); Duck Whan Kim, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 270 days.

(21) Appl. No.: 16/773,410

(22) Filed: Jan. 27, 2020

(65) Prior Publication Data
US 2021/0138915 A1    May 13, 2021

(30) Foreign Application Priority Data
Nov. 12, 2019  (KR) ........................ 10-2019-0144313

(51) Int. Cl.
*B60L 50/71*   (2019.01)
*H01M 8/2465*  (2016.01)
*B60L 50/72*   (2019.01)

(52) U.S. Cl.
CPC .............. *B60L 50/71* (2019.02); *B60L 50/72* (2019.02); *H01M 8/2465* (2013.01); *H01M 2250/20* (2013.01)

(58) Field of Classification Search
CPC ........ B60L 50/71; B60L 50/72; H01M 8/2465
USPC ........................................................ 429/400
See application file for complete search history.

(56) References Cited

U.S. PATENT DOCUMENTS

| 2015/0027796 | A1  | 1/2015  | Naito et al. |           |
|--------------|-----|---------|--------------|-----------|
| 2016/0114667 | A1* | 4/2016  | Ikeda        | B60L 50/71 |
|              |     |         |              | 180/68.5  |
| 2017/0133691 | A1  | 5/2017  | Yamafuji     |           |
| 2017/0256762 | A1* | 9/2017  | Naito        | B60L 50/71 |
| 2018/0272889 | A1* | 9/2018  | Nakamura     | H01F 37/00 |

FOREIGN PATENT DOCUMENTS

| JP | 5851527 B2 | 2/2016  |
| JP | 6414021 B2 | 10/2018 |

* cited by examiner

*Primary Examiner* — James M Erwin
(74) *Attorney, Agent, or Firm* — Slater Matsil, LLP

(57) ABSTRACT

A fuel cell vehicle includes a fuel cell frame including an outer frame and an inner frame disposed inside the outer frame, an upper structure disposed on the fuel cell frame, and a lower structure disposed under the fuel cell frame. The inner frame is formed in the shape of a partition dividing an inner space surrounded by the outer frame into a plurality of hollows.

19 Claims, 19 Drawing Sheets

FUEL CELL VEHICLE

CROSS-REFERENCE TO RELATED APPLICATIONS

This application claims priority to Korean Patent Application No. 10-2019-0144313, filed on Nov. 12, 2019, which application is hereby incorporated herein by reference.

TECHNICAL FIELD

Embodiments relate to a fuel cell vehicle.

BACKGROUND

In general, a vehicle equipped with a fuel cell produces electricity by supplying reactant gases, i.e., hydrogen used as a fuel and air containing oxygen used as an oxidant to a cell stack of the fuel cell. The vehicle is driven by operating a drive motor using electricity produced by the cell stack. Here, the electricity generated by the cell stack is appropriately transferred to a fuel cell powertrain, which includes the drive motor and a speed reducer, to drive the vehicle.

When the fuel cell and the powertrain are directly mounted to the chassis of the vehicle without using a separate frame, the overall thickness (or the height) of the fuel cell system including the fuel cell and the powertrain may be reduced compared to when a separate frame is used. However, in this case, the force of clamping the cell stack may be affected by vibration occurring while the vehicle is driven, and the airtightness of the cell stack may be deteriorated. In addition, since it is difficult to install all components in the cell stack, it may be difficult to form an integrated fuel cell system. This is because an air compressor and the like need to be installed separately from the cell stack.

Therefore, the fuel cell system may be implemented using a separate frame. In this case, however, the overall thickness of the fuel cell system may increase due to the thickness of the separate frame. In particular, in order to enable installation of the fuel cell system in a vehicle having a relatively small engine compartment or in a train in which interference with an existing trolley line needs to be avoided, a reduction in the thickness of the fuel cell system is desperately required.

SUMMARY

Accordingly, embodiments are directed to a fuel cell vehicle that substantially obviates one or more problems due to limitations and disadvantages of the related art.

Embodiments provide a fuel cell vehicle including a fuel cell system having a small thickness.

In one embodiment, a fuel cell vehicle may include a fuel cell frame including an outer frame and an inner frame disposed inside the outer frame, an upper structure disposed on the fuel cell frame, and a lower structure disposed under the fuel cell frame. The inner frame may be formed in the shape of a partition dividing an inner space surrounded by the outer frame into a plurality of hollows.

For example, the outer frame may have a planar annular shape surrounding a vertically projecting surface of a cell stack.

For example, the first planar area of the inner space of the outer frame may be greater than the second planar area of a vertically projecting surface of a cell stack.

For example, the first rigidity of the outer frame may be greater than the second rigidity of the inner frame.

For example, the first thickness of the outer frame may be greater than the second thickness of the inner frame in a vertical direction.

For example, the outer frame and the inner frame may be integrally formed with each other, or may be formed separately from each other.

For example, the material of the outer frame and the material of the inner frame may be the same as each other.

For example, the material of at least one of the outer frame or the inner frame may include metal.

For example, the material of the outer frame and the material of the inner frame may be different from each other.

For example, the inner frame may be welded to the outer frame.

For example, at least one of the outer frame or the inner frame may have a section having a hollow shape, a truss shape, or a honeycomb shape.

For example, at least one of the outer frame or the inner frame may include a first coupling part configured to be coupled to at least one of the upper structure or the lower structure.

For example, the first coupling part may be embedded into at least one of the outer frame or the inner frame.

For example, at least one of the upper structure or the lower structure may include a second coupling part configured to be coupled to the first coupling part.

For example, at least one of the upper structure or the lower structure may further include a third coupling part, and the upper structure and the lower structure may be coupled to each other by the third coupling part.

For example, at least one of the second coupling part or the third coupling part may be embedded into at least one of the upper structure or the lower structure.

For example, any one of the first coupling part, the second coupling part, and the third coupling part may include at least one of a stud nut, a clinching nut, or a blind rivet nut, and the other one of the first coupling part, the second coupling part, and the third coupling part may include at least one of a stud bolt, a clinching bolt, or a blind rivet bolt.

For example, the second coupling part may include a mounting boss part protruding from the outer side surface of the upper structure such that at least a portion thereof overlaps the top surface of the outer frame in a vertical direction.

For example, the height of the bottom surface of the mounting boss part contacting the top surface of the outer frame may be greater than the height of the bottom surface of the upper structure on the basis of the ground.

For example, the upper structure may include an enclosure protecting a cell stack, and the mounting boss part may protrude from the outer side surface of the enclosure.

For example, the height of the top surface of the outer frame may be greater than the height of the bottom surface of the upper structure on the basis of the ground.

For example, the inner frame may include a step formed thereon.

For example, the inner frame may include a first portion on which the upper structure is mounted and a second portion under which the lower structure is mounted. The second portion may have a height greater than the height of the first portion on the basis of the ground, and the step may be formed between the first portion and the second portion.

For example, the bottom surface of the upper structure mounted on the first portion may be located in the same horizontal plane as the top surface of the lower structure mounted under the second portion on the basis of the ground.

For example, the bottom surface of the upper structure mounted on the first portion may be lower than the top surface of the lower structure mounted under the second portion on the basis of the ground.

For example, at least a portion of the upper structure mounted on the first portion and at least a portion of the lower structure mounted under the second portion may overlap each other in a horizontal direction.

For example, at least one of the plurality of hollows may have a size such that a portion of the end of the upper structure or the lower structure is capable of being inserted therein.

For example, the upper structure may include at least one of a cell stack, a high-voltage junction box, or a cooling pump, and the lower structure may include at least one of a humidifier, an air compressor, or a drive motor.

BRIEF DESCRIPTION OF THE DRAWINGS

Arrangements and embodiments may be described in detail with reference to the following drawings in which like reference numerals refer to like elements and wherein.

DETAILED DESCRIPTION OF ILLUSTRATIVE EMBODIMENTS

Figure 1A:
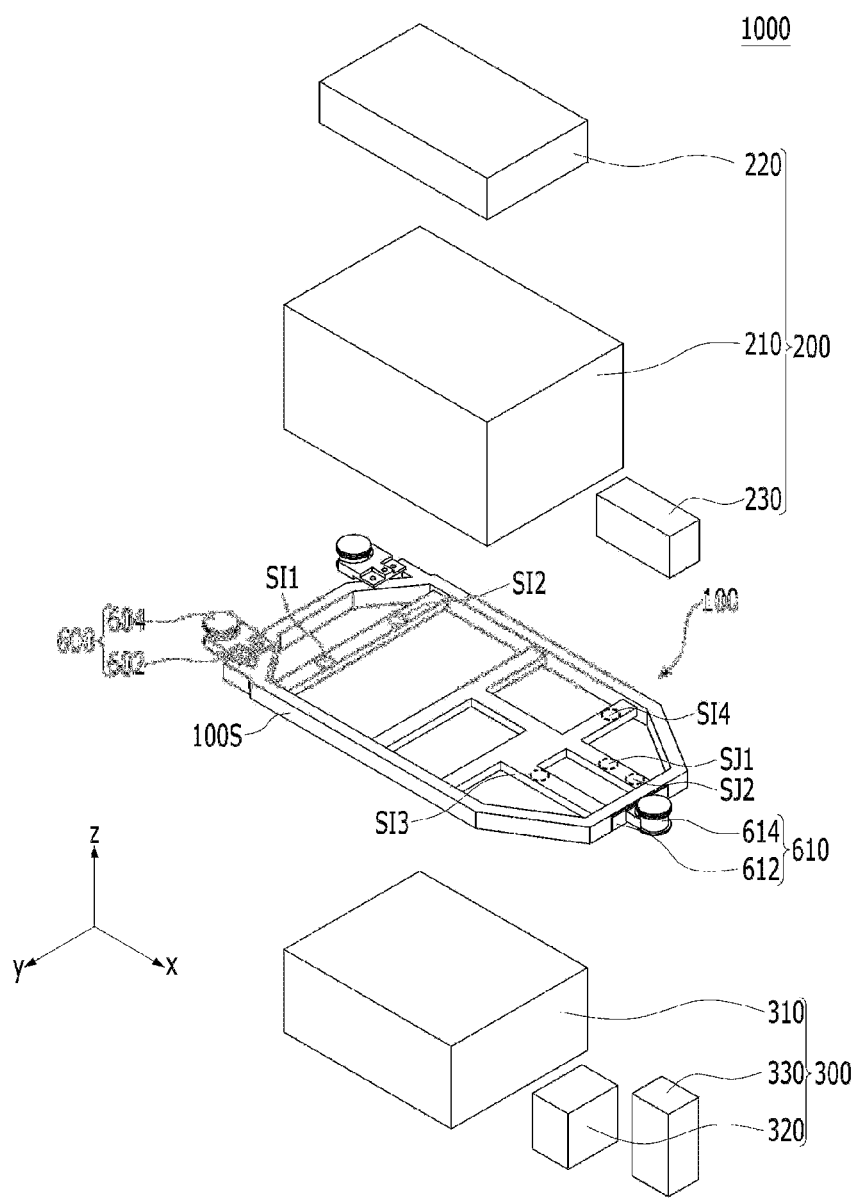
FIGS. 1A to 1C illustrate a fuel cell vehicle according to an embodiment.

The present disclosure will now be described more fully hereinafter with reference to the accompanying drawings, in which various embodiments are shown. The examples, however, may be embodied in many different forms and should not be construed as being limited to the embodiments set forth herein. Rather, these embodiments are provided so that this disclosure will be more thorough and complete, and will more fully convey the scope of the disclosure to those skilled in the art.

It will be understood that when an element is referred to as being "on" or "under" another element, it may be directly on/under the element, or one or more intervening elements may also be present.

When an element is referred to as being "on" or "under", "under the element" as well as "on the element" may be included based on the element.

In addition, relational terms, such as "first", "second", "on/upper part/above" and "under/lower part/below", are used only to distinguish between one subject or element and another subject or element, without necessarily requiring or involving any physical or logical relationship or sequence between the subjects or elements.

Hereinafter, a fuel cell vehicle according to embodiments will be described with reference to the accompanying drawings. The fuel cell vehicle will be described using the Cartesian coordinate system (x-axis, y-axis, z-axis) for convenience of description. However, other different coordinate systems may be used. In the drawings, the x-axis, the y-axis, and the z-axis of the Cartesian coordinate system are perpendicular to each other. However, the disclosure is not limited thereto. That is, the x-axis, the y-axis, and the z-axis may intersect each other. Hereinafter, a vertical direction may mean the z-axis direction, and a horizontal direction may mean at least one of the x-axis direction or the y-axis direction. In addition, the y-axis direction may be the direction in which a fuel cell vehicle according to one embodiment travels. However, according to another embodiment, a fuel cell vehicle may travel in the x-axis direction.

Figure 1B:
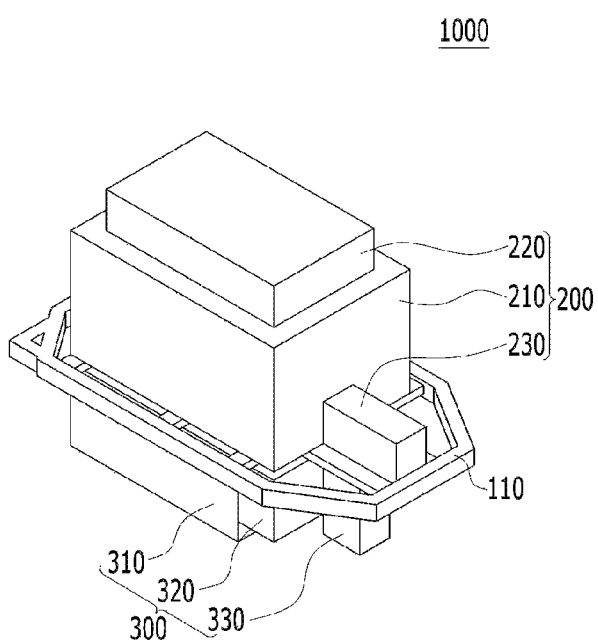
Figure 1B:
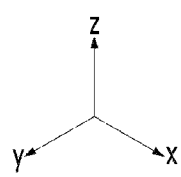
Figure 1C:
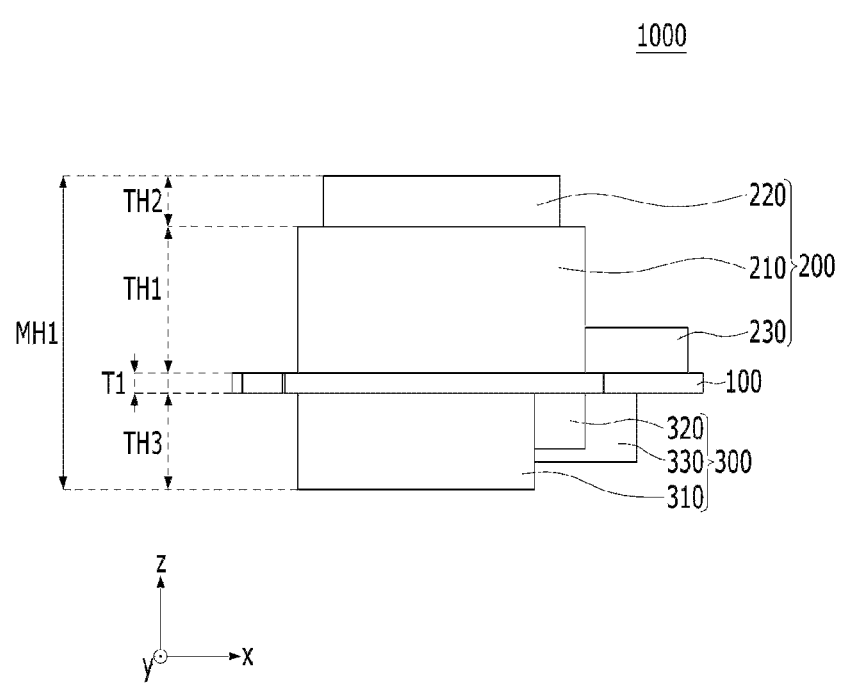

FIGS. 1A to 1C illustrate a fuel cell vehicle according to an embodiment. FIG. 1A is an exploded perspective view of a fuel cell system 1000 included in the fuel cell vehicle according to an embodiment, FIG. 1B is a coupled perspective view of the fuel cell system 1000 according to the embodiment, and FIG. 1C is a front view of the fuel cell system 1000 according to the embodiment.

The fuel cell vehicle may include a fuel cell system 1000. The fuel cell system 1000 in the fuel cell vehicle may include a fuel cell frame (or a cross member) 100, an upper structure 200, and a lower structure (or a fuel cell powertrain) 300. Alternatively, the fuel cell system 1000 in the fuel cell vehicle may refer to an assembly in which the upper structure 200 and the lower structure 300 are coupled and secured to the fuel cell frame 100.

The upper structure 200 may be disposed on the fuel cell frame 100, and the lower structure 300 may be disposed under the fuel cell frame 100.

The upper structure 200 may be at least one component part disposed on the fuel cell frame 100 and coupled to the fuel cell frame 100, among various components included in the fuel cell vehicle. For example, the upper structure 200 may include at least one of a fuel cell (or a cell stack) 210, a high-voltage junction box (or a junction box) 220, or a cooling pump 230.

In addition, the lower structure 300 may be at least one component disposed under the fuel cell frame 100 and coupled to the fuel cell frame 100, among various components included in the fuel cell vehicle. For example, the lower structure 300 may include at least one of a humidifier 310 or an air compressor 320. According to another embodiment, the lower structure 300 may include at least one of the humidifier 310, the air compressor 320, or a drive motor 330.

In addition, the positions at which the cell stack 210, the high-voltage junction box 220, and the cooling pump 230 are disposed relative to each other and the sizes of the cell stack 210, the high-voltage junction box 220, and the cooling pump 230 relative to each other shown in FIGS. 1A to 1C are merely illustrative, and the disclosure is not limited as to the specific positions or specific sizes of these components 210, 220 and 230 relative to each other. Similarly, the positions at which the humidifier 310, the air compressor 320, and the drive motor 330 are disposed relative to each other or the sizes of the humidifier 310, the air compressor 320, and the drive motor 330 relative to each other shown in FIGS. 1A to 1C are merely illustrative, and the disclosure is not limited as to the specific positions or specific sizes of these components 310, 320 and 330 relative to each other.

Hereinafter, as shown in FIGS. 1A to 1C, the fuel cell system 1000 according to the embodiment will be described as being configured such that the upper structure 200 includes the cell stack 210, the high-voltage junction box 220, and the cooling pump 230 and such that lower structure 300 includes the humidifier 310, the air compressor 320, and the drive motor 330. However, the following description of the fuel cell system 1000 may be applied regardless of the type and number of components included in the respective upper structure 200 and the lower structure 300.

The components included in the respective upper structure 200 and the lower structure 300 will be briefly described below.

The cell stack 210 may include a plurality of unit cells, which are stacked in a horizontal direction (e.g., the x-axis direction or the y-axis direction). The cell stack 210 may be formed by stacking several tens to several hundreds of unit cells, e.g., 100 to 400 unit cells.

The high-voltage junction box 220 serves to distribute the power generated by the cell stack 210 of the fuel cell. For example, the high-voltage junction box 220 may include a fuse (not shown) and a relay (not shown) to control peripheral auxiliary components (balance-of-plant (BOP)) assisting in the operation of the fuel cell.

The cooling pump 230 serves to discharge cooling water from the cell stack 210.

The air compressor 320 serves to suction and compress external air, and the humidifier 310 serves to humidify the air discharged from the air compressor 320 such that the air has appropriate humidity and to supply the air to the air electrode of the fuel cell. The drive motor 330 serves to generate drive force using drive current (e.g., three-phase current) and to transmit the drive force to the drive wheels of the fuel cell vehicle through the rotary shaft.

The fuel cell frame 100 may be disposed between the upper structure 200 and the lower structure 300, and may be coupled to the same 200 and 300. The fuel cell frame 100 described below may be applied to the fuel cell system 1000 without being limited as to the type, number, and shape of the components included in the upper structure 200 and the lower structure 300.

Figure 2A:
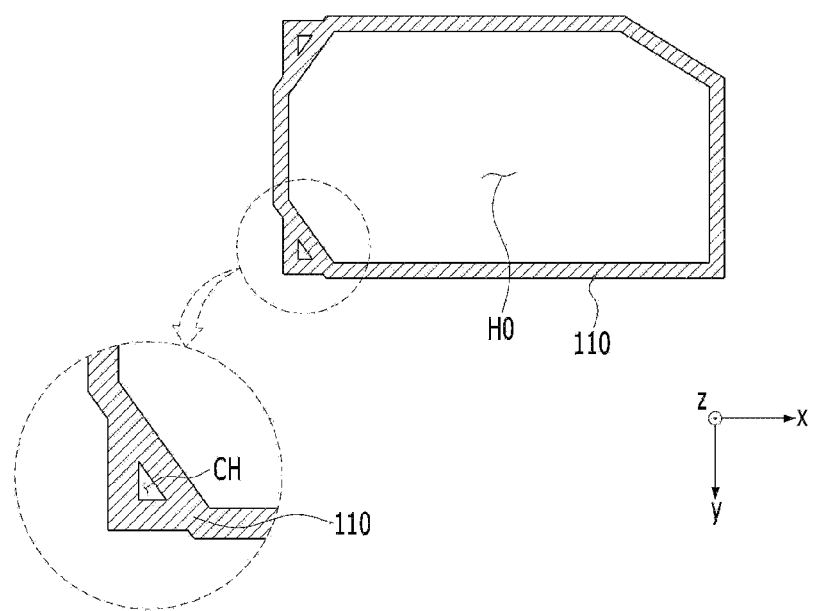
FIGS. 2A to 2D illustrate a fuel cell frame according to an embodiment.
Figure 2B:
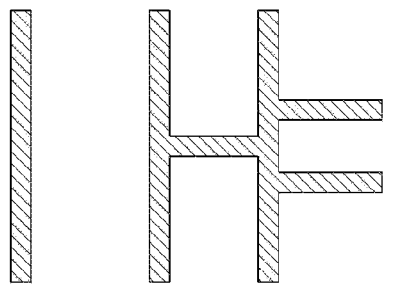
Figure 2C:
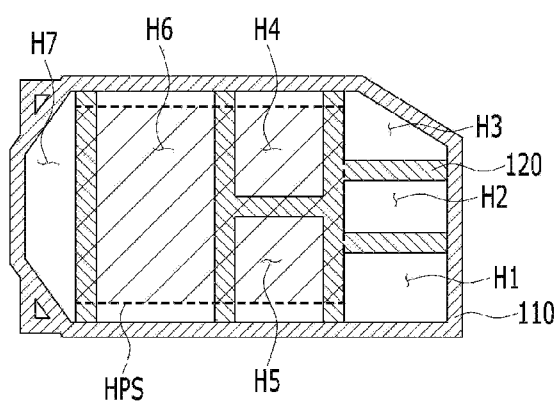
Figure 2C:
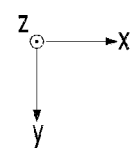
Figure 2D:
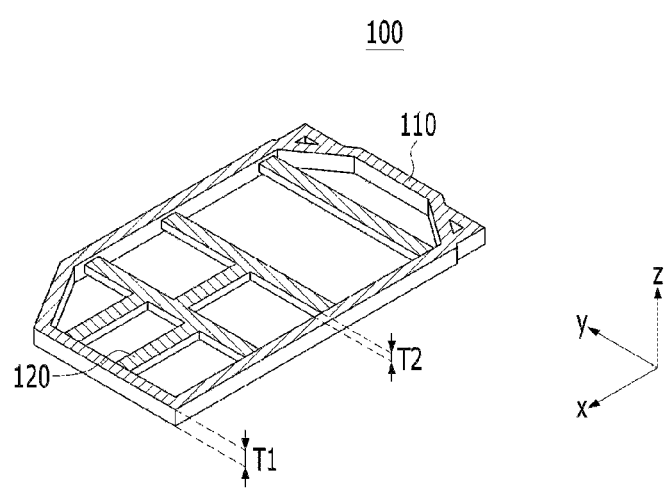

FIGS. 2A to 2D illustrate the fuel cell frame 100 according to the embodiment. FIG. 2A is a plan view of an outer frame 110 of the fuel cell frame 100, FIG. 2B is a plan view of an inner frame 120 of the fuel cell frame 100, FIG. 2C is a plan view of the fuel cell frame 100, and FIG. 2D is a perspective view of the fuel cell frame 100.

Before describing the outer frame 110 and the inner frame 120 according to the embodiment, first and second vehicle connection parts 600 and 610 for connecting the fuel cell system 1000 to other parts of the fuel cell vehicle will be described below with reference to FIGS. 1A, 2A, 2C and 2D.

For convenience of description, the illustration of the first and second vehicle connection parts 600 and 610 is omitted from FIGS. 1B and 1C.

The first and second vehicle connection parts 600 and 610 may be disposed on the outer side surface 100S of the outer frame 110 so as to be spaced apart from each other, and may serve to connect the fuel cell frame 100 of the fuel cell system 1000 to a side member (not shown) of the vehicle and to absorb shocks. Here, the side member may correspond to the body (or, chassis) of the vehicle.

The first vehicle connection part 600 may include a first mounting bracket 602 and a first bush (or a first mount insulator) 604. The first mounting bracket 602 may be coupled to the outer side surface 100S of the outer frame 110 to support the first bush 604. The first bush 604 may be disposed between the first mounting bracket 602 and the side member of the vehicle, and may have a vibration-isolating characteristic. Thus, the first bush 604 may prevent or minimize the transmission of vibrations from the outer frame 110 to the side member of the vehicle, and may prevent or minimize the transmission of vibrations from the side member of the vehicle to the outer frame 110.

Similar to the first vehicle connection part 600, the second vehicle connection part 610 may include a second mounting bracket 612 and a second bush (or a second mount insulator) 614. The second mounting bracket 612 may be coupled to the outer side surface 100S of the outer frame 110 so as to be spaced apart from the first mounting bracket 602, and may support the second bush 614. The second bush 614 may be disposed between the second mounting bracket 612 and the side member of the vehicle, and may have a vibration-isolating characteristic. Thus, the second bush 614 may prevent or minimize the transmission of vibrations from the outer frame 110 to the side member of the vehicle, and may prevent or minimize the transmission of vibrations from the side member of the vehicle to the outer frame 110.

In addition, the outer frame 110 may further include a connection recess CH. As illustrated in FIG. 2A, the first mounting bracket 602 of the first vehicle connection part 600 may be mounted in the connection recess CH, which is formed in the outer side surface SO of the outer frame 110, e.g., in the corner of the outer frame 110. The second mounting bracket 612 of the second vehicle connection part 610 may be directly coupled to the outer side surface SO of the outer frame 110.

Unlike the configuration in which the first mounting bracket 602 is inserted into the connection recess CH shown in FIG. 2A, the second mounting bracket 612 may be directly coupled to the outer side surface SO of the outer frame 110. However, according to another embodiment, similar to the configuration shown in FIGS. 1A and 2A, in which the first mounting bracket 602 of the first vehicle connection part 600 is disposed in the connection recess CH, a separate connection recess (not shown) for installation of the second mounting bracket 612 of the second vehicle connection part 610 may be formed in the side surface of the outer frame 110, and the second mounting bracket 612 may be inserted into the separate connection recess.

Alternatively, similar to the configuration shown in FIGS. 1A and 2A, in which the second mounting bracket 612 is coupled to the outer side surface SO of the outer frame 110, the first mounting bracket 602 may not be disposed in the separate connection recess CH, but may be disposed on the outer side surface SO of the outer frame 110.

Although three vehicle connection parts 600 and 610 are illustrated in FIG. 1A, the disclosure is not limited as to the number of vehicle connection parts 600 and 610 or the specific form in which the vehicle connection parts 600 and 610 are coupled to the fuel cell frame 100. That is, according to another embodiment, the number of vehicle connection parts may be two or less or four or more.

Referring again to FIGS. 1A to 2, the outer frame 110 may have a planar annular shape that surrounds a vertically projecting surface HPS of the cell stack 210. Here, the vertically projecting surface HPS may be the surface, the shadow of which is formed on the ground when light is projected onto the cell stack 210 in the −z-axis direction. That is, the planar area (hereinafter, referred to as a "first planar area") of an inner space HO of the outer frame 110 may be greater than the planar area (hereinafter, referred to as a "second planar area") of the vertically projecting surface HPS of the cell stack 210.

The inner frame 120 may be disposed inside the outer frame 110. The inner frame 120 may be formed in the shape of a partition that divides the inner space HO surrounded by the outer frame 110 into a plurality of hollows. For example, the inner space HO may be divided into a plurality of (e.g., seven) hollows H1 to H7 by the partition-shaped inner frame 120, as illustrated in FIG. 2C. However, the disclosure is not limited as to the specific number, specific shape, or specific position of the hollows.

In addition, at least one of the plurality of hollows (e.g., H1 to H7) may have a size such that a portion of the end of the upper structure 200 or the lower structure 300 is capable of being inserted therein.

In addition, each of the components 210, 220 and 230 included in the upper structure 200 and each of the components 310, 320 and 330 included in the lower structure 300 are illustrated as being formed in a hexahedral shape in FIGS. 1A and 1B. However, each of these components 210, 220, 230, 310, 320 and 330 may have an inherent shape, and the fuel cell frame 100, particularly the outer frame 110, may have a planar annular shape that surrounds the vertically projecting surfaces of the components 210, 220, 230, 310, 320 and 330. Alternatively, the outer frame 110 may have a planar annular shape that prevents the vertically projecting surfaces of the components 210, 220, 230, 310, 320 and 330 from protruding out of the outer frame 110.

The upper structure 200 of the fuel cell system 1000 may be mounted (disposed, coupled, assembled, seated, attached, or secured) on the inner frame 120, and the lower structure 300 may be mounted (disposed, coupled, assembled, seated, attached, or secured) under the inner frame 120.

The outer frame 110 serves to secure the rigidity of the fuel cell frame 100, and the inner frame 120 serves to divide the region in which the upper structure 200 and the lower structure 300 are fixed and coupled to the fuel cell frame 100. To this end, the first rigidity of the outer frame 110 may be greater than the second rigidity of the inner frame 120.

In addition, in order to reduce the overall height MH1 of the fuel cell system 100, a portion of the end of at least one of the upper structure 200 or the lower structure 300 may be inserted into the inner space HO of the outer frame 110. To this end, the thickness (hereinafter, referred to as a "first thickness T1") of the outer frame 110 in the vertical direction may be greater than the thickness (hereinafter, referred to as a "second thickness T2") of the inner frame 120 in the vertical direction. When the second thickness T2 is less than the first thickness T1, the overall height MH1 may be reduced, and the reason for this will be described in detail later with reference to FIGS. 1C and 12.

In addition, the outer frame 110 and the inner frame 120 may be integrally formed with each other, or may be formed separately from each other.

The material of the outer frame 110 and the material of the inner frame 120 may be the same as or different from each other. In particular, when the outer frame 110 and the inner frame 120 are formed separately from each other, the material of the outer frame 110 and the material of the inner frame 120 may be different from each other. For example, the material of at least one of the outer frame 110 or the inner frame 120 may include metal, e.g., aluminum.

When the outer frame 110 and the inner frame 120 are formed separately from each other, the inner frame 120 may be welded to the outer frame 110. However, the disclosure is not limited as to the specific form in which the inner frame 120 is coupled to the outer frame 110.

FIGS. 3A to 3D illustrate the sections of various examples of each of the outer frame 110 and the inner frame 120.

When the first thickness T1 of the outer frame 110 and the second thickness T2 of the inner frame 120 are reduced in order to reduce the overall thickness (or the height MH1) of the fuel cell system 1000, the rigidity of the fuel cell frame 100 may be lowered. In order to reinforce the fuel cell frame 100, if the interior of the outer frame 110 and the interior of the inner frame 120 (particularly, the interior of the outer frame 110) are filled with a material having high rigidity, the overall weight of the fuel cell system 1000 may increase. Therefore, in order to avoid an increase in the weight of the fuel cell system 1000 while reducing the overall height MH1 thereof, the interior of each of the outer frame 110 and the inner frame 120 of the fuel cell frame 120 (particularly, the interior of the outer frame 110) may be implemented in any of various shapes, as shown in FIGS. 3A to 3D.

Figure 3A:
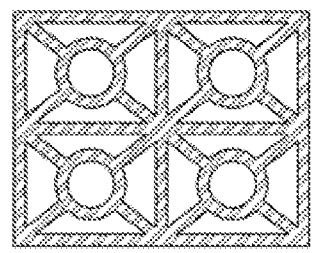
FIGS. 3A to 3D illustrate the sections of various examples of each of an outer frame and an inner frame.
Figure 3A:
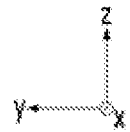

According to one embodiment, the section of each of the outer frame 110 and the inner frame 120 may have a honeycomb shape, as shown in FIG. 3A.

Figure 3B:
Figure 3B:
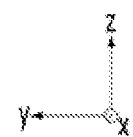

According to another embodiment, the section of each of the outer frame 110 and the inner frame 120 may have a hollow shape, as shown in FIG. 3B.

Figure 3C:
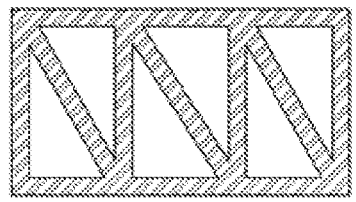
Figure 3C:
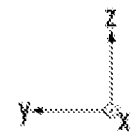
Figure 3D:
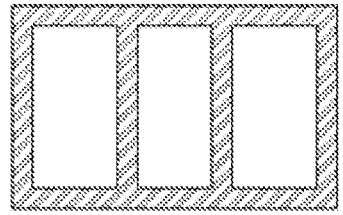
Figure 3D:
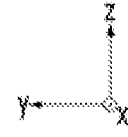

According to still another embodiment, the section of each of the outer frame 110 and the inner frame 120 may have a truss shape, as shown in FIGS. 3C and 3D.

The shapes of the section of each of the outer frame 110 and the inner frame 120 shown in FIGS. 3A to 3D are merely illustrative. The section of each of the outer frame 110 and the inner frame 120 may have any of various shapes, other than the shapes shown in FIGS. 3A to 3D, so long as it increases the rigidity of the fuel cell frame 100 without increasing the weight thereof.

Figure 4:
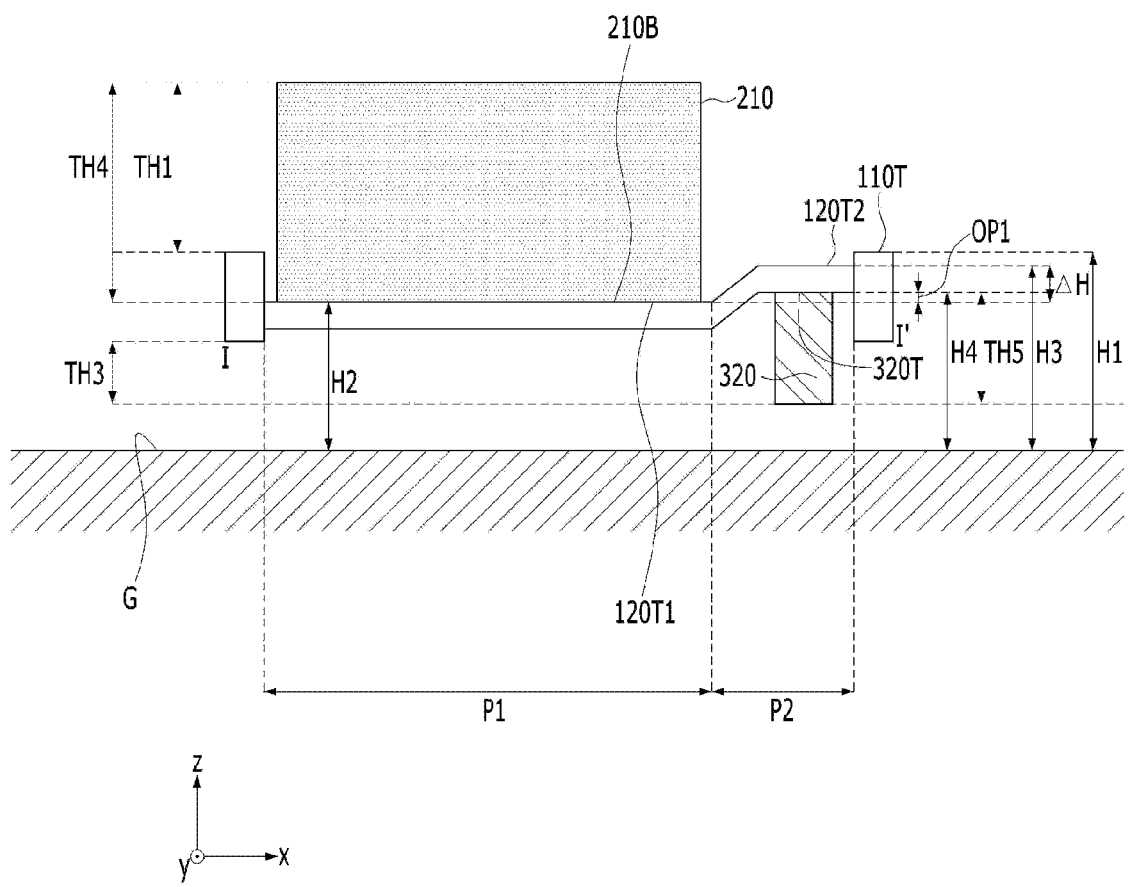
FIG. 4 is a partial cross-sectional view of an example of the fuel cell system shown in FIGS. 1A to 1C.

FIG. 4 is a partial cross-sectional view of an example of the fuel cell system 1000 shown in FIGS. 1A to 1C according to an embodiment.

Hereinafter, the fuel cell system 1000, in which the upper structure 200 mounted on the fuel cell frame 100 is the cell stack 210 and the lower structure 300 mounted under the fuel cell frame 100 is the air compressor 320, will be described with reference to FIG. 4. The following description may also be applied to the configuration in which the upper structure 200 mounted on the fuel cell frame 100 is the high-voltage junction box 220 or the cooling pump 230 and the lower structure 300 mounted under the fuel cell frame 100 is the humidifier 310 or the drive motor 330.

According to an embodiment, the height (hereinafter, referred to as a "first height H1") of the top surface 110T of the outer frame 110 on the basis of the ground G may be greater than the height (hereinafter, referred to as a "second height H2") of the bottom surface 210B of the cell stack 210, which is mounted on the fuel cell frame 100, on the basis of the ground G.

In addition, the inner frame 120 may have a step. This will be described in detail below.

The inner frame 120 may include a first portion P1 and a second portion P2.

The first portion P1 is defined as a portion on which the upper structure 200 (e.g., 210) is mounted, and the second portion P2 is defined as a portion under which the lower structure 300 (e.g., 320) is mounted. The height of the first portion P1 may be the same as the second height H2. The height (hereinafter, referred to as a "third height H3") of the second portion P2 on the basis of the ground G may be greater than the second height H2 of the first portion P1 on the basis of the ground G. That is, the first portion P1 and the second portion P2 of the inner frame 120 may form a step therebetween. Here, the step may mean a height difference ΔH between a top surface 120T1 of the first portion P1 and a top surface 120T2 of the second portion P2 in the inner frame 120.

In addition, the bottom surface 210B of the cell stack 210 mounted on the first portion P1 of the inner frame 120 may be located in the same horizontal plane as a top surface 320T of the cooling pump 320 mounted under the second portion P2 of the inner frame 120, on the basis of the ground G. That is, when the top surface 320T of the cooling pump 320 mounted under the second portion P2 of the inner frame 120 has a predetermined height (hereinafter, referred to as a "fourth height H4") on the basis of the ground G, the second height H2 and the fourth height H4 may be the same as each other.

Alternatively, the second height H2 of the bottom surface 210B of the cell stack 210 mounted on the first portion P1 of the inner frame 120 may be less than the fourth height H4 of the top surface 320T of the cooling pump 320 mounted under the second portion P2 of the inner frame 120, on the basis of the ground G. That is, at least a portion of the end of the cell stack 210 mounted on the first portion P1 of the inner frame 120 and at least a portion of the end of the cooling pump 320 mounted under the second portion P2 of the inner frame 120 may overlap each other (refer to OP1 in FIG. 4) in the horizontal direction.

As described above, when the inner frame 120 has a step and when the upper structure 200 and the lower structure 300 are respectively disposed on and under the inner frame 120 having the step, the distance between the upper structure 200 and the lower structure 300, i.e., the spacing distance in the vertical direction of the overlapping portion OP1, may be minimized. When the second height H2 and the fourth height H4 are the same as each other, the spacing distance in the vertical direction of the overlapping portion OP1 becomes zero.

When the second height H2 is less than the fourth height H4, the spacing distance in the vertical direction of the overlapping portion OP1 may have a negative (−) value. In this case, the thickness (i.e., the first thickness T1) occupied by the fuel cell frame 100 has no influence on the overall thickness MH1 of the fuel cell system 1000. In other words, the first thickness T1 is excluded from the overall thickness MH1. Thus, the overall thickness MH1 may be reduced by the first thickness T1.

Each of the upper structure 200 and the lower structure 300 may be coupled and secured to at least one of the outer frame 110 or the inner frame 120 in any of various forms. To this end, at least one of the outer frame 110 or the inner frame 120 may include a first coupling part that is coupled to at least one of the upper structure 200 or the lower structure 300. At least one of the upper structure 200 or the lower structure 300 may include a second coupling part. The second coupling part may be disposed opposite the first coupling part, and may be coupled and secured to the outer frame 110 or to the inner frame 120.

For example, the first coupling part may be disposed at each of coupling portions SI1, SI2, SI3 and SI4 shown in FIG. 1A, and may be coupled to the second coupling part of the cell stack 210, which is the upper structure 200, thereby securing the cell stack 210 to the inner frame 120. Similarly, the first coupling part may be disposed at each of coupling portions SJ1 and SJ2 shown in FIG. 1A, and may be coupled to the second coupling part of the cooling pump 230, which is the upper structure 200, thereby securing the cooling pump 230 to the inner frame 120.

In addition, the upper structure 200 and the lower structure 300 may be coupled to each other in any of various forms in the state of being secured to at least one of the outer frame no or the inner frame 120. To this end, at least one of the upper structure 200 or the lower structure 300 may further include a third coupling part, and the corresponding upper structure 200 and the corresponding lower structure 300 may be coupled to each other by the third coupling part.

Figure 5:
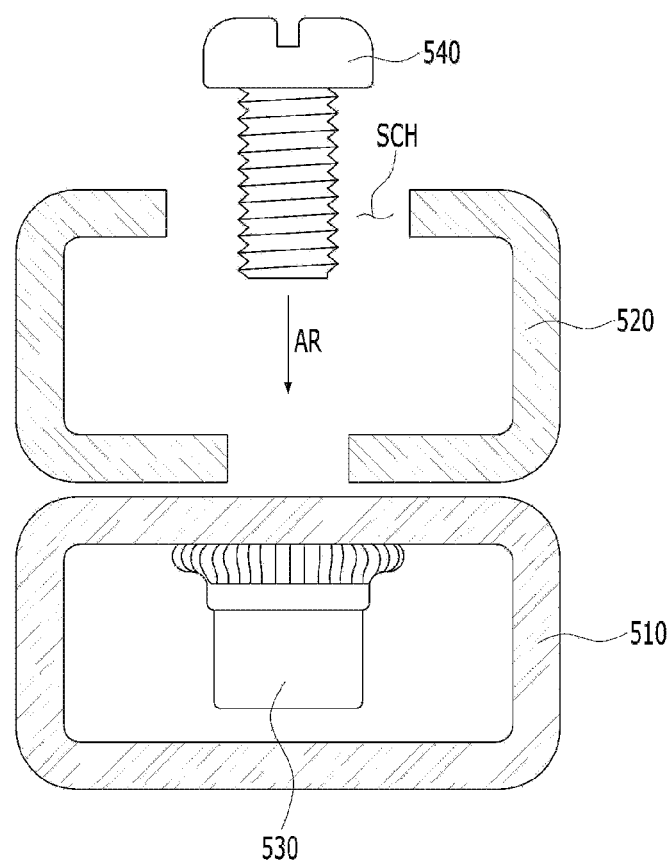
FIG. 5 is an exemplary cross-sectional view of an embodiment for explaining the coupling relationships among a fuel cell frame, an upper structure, and a lower structure.

FIG. 5 is an exemplary cross-sectional view of an embodiment for explaining the coupling relationships among the fuel cell frame 100, the upper structure 200, and the lower structure 300.

According to an embodiment, the first coupling part may be embedded into at least one of the outer frame 110 or the inner frame 120. In addition, similar to this, at least one of the second coupling part or the third coupling part may be embedded into at least one of the upper structure 200 or the lower structure 300.

Referring to FIG. 5, first and second members 510 and 520 may be coupled to each other by two coupling parts 530 and 540. Each of the first and second members 510 and 520 may have a hollow portion. One 530 of the two coupling parts 530 and 540 may be embedded into the first member 510, and the other one 540 of the two coupling parts 530 and 540 may pass through a screw hole SCH formed in the second member 520 in the direction indicated by the arrow AR and may be coupled to the coupling part 530.

One 510 of the first and second members 510 and 520 shown in FIG. 5 may correspond to the outer frame 110 or the inner frame 120, and the other one 520 of the first and second members 510 and 520 may be the upper structure 200 or the lower structure 300. In this case, the coupling part 530 embedded into the first member 510 shown in FIG. 5 may correspond to, for example, the aforementioned first coupling part, which may be disposed at each of the portions SI1, SI2, SI3 and SI4 shown in FIG. 1A, and the other coupling part 540, which is coupled to the coupling part 530 in the direction indicated by the arrow AR at the second member 510 shown in FIG. 5, may correspond to the aforementioned second coupling part disposed at the upper structure 200 or the lower structure 300.

Alternatively, one 510 of the first and second members 510 and 520 shown in FIG. 5 may correspond to the outer frame 110 (or the inner frame 120), and the other one 520 of the first and second members 510 and 520 may correspond to the inner frame 120 (or the outer frame 110). In this case, each of the coupling part 530 embedded into the first member 510 shown in FIG. 5 and the other coupling part 540, which is introduced into the second member 520 in the direction indicated by the arrow AR and is coupled to the coupling part 530, may correspond to the aforementioned third coupling part disposed at the upper structure 200 or the lower structure 300.

According to an embodiment, at least one of the first to third coupling parts may include at least one of a stud nut, a clinching nut, or a blind rivet nut, and the other one of the first to third coupling parts may include at least one of a stud bolt (or screw), a clinching bolt (or screw), or a blind rivet bolt (or screw). Here, the stud nut means a nut that is coupled to a stud bolt, the clinching bolt means a bolt that is coupled with a clinching nut, and the blind rivet bolt means a bolt that is coupled to a blind rivet nut.

For example, when any one of the first to third coupling parts is a clinching nut, the other one of the first to third coupling parts that is coupled to the clinching nut may be a screw, which may pass through a screw hole formed in the corresponding member and may be engaged with the clinching nut.

For example, when any one of the first to third coupling parts is a blind rivet nut, the other one of the first to third coupling parts that is coupled to the blind rivet nut may be a screw, which may pass through the screw hole SCH (refer to FIG. 5) in the direction indicated by the arrow and may be engaged with the blind rivet nut. Even when any one of the members 510 and 520 has a hollow shape and has a small thickness, the blind rivet nut may implement a female screw tap, and may thus be useful for the member 510 or 520 having a hollow shape.

Hereinafter, the second coupling part according to an embodiment will be described with reference to the accompanying drawings.

Figure 6A:
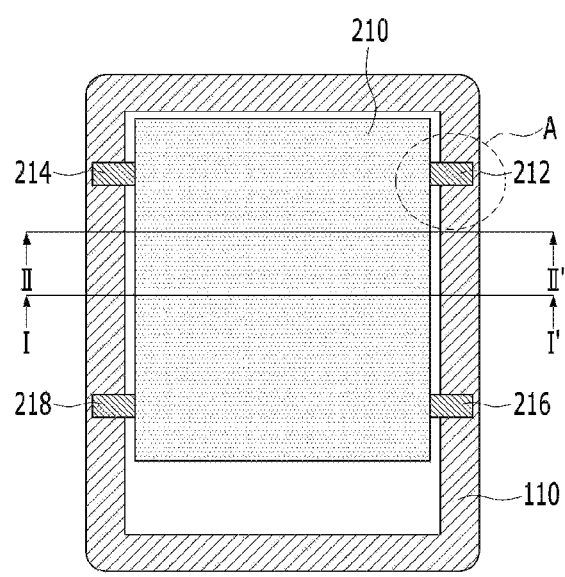
FIGS. 6A and 6B are respectively a plan view and a cross-sectional view of another example of the fuel cell system.
Figure 6B:
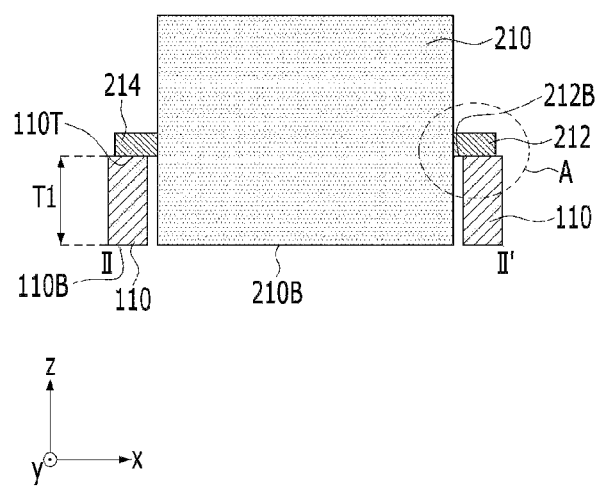

FIGS. 6A and 6B are respectively a plan view and a cross-sectional view of another example of the fuel cell system 1000.

FIG. 4 is a cross-sectional view taken along line I-I' in the fuel cell system 1000 shown in FIG. 6A, and FIG. 6B is a cross-sectional view taken along line II-II' in the fuel cell system 1000 shown in FIG. 6A.

Referring to FIGS. 6A and 6B, the second coupling part is illustrated as being included in the cell stack 210, which is the upper structure 200. However, the following description may also be applied to the configuration in which the upper structure 200 mounted on the fuel cell frame 100 is the high-voltage junction box 220 or the cooling pump 230.

The second coupling part may include mounting boss parts 212, 214, 216 and 218, each of which protrudes from the outer side surface of the upper structure 210 and at least a portion of which overlaps the top surface 110T of the outer frame 110 in the vertical direction. Referring to FIG. 6A, the second coupling part is illustrated as including four mounting boss parts 212, 214, 216 and 218. However, the disclosure is not limited as to the number of mounting boss parts 212, 214, 216 and 218 included in the second coupling part or the positions in the plane from which the mounting boss parts 212, 214, 216 and 218 protrude.

Referring to FIGS. 6A and 6B, the height of the bottom surface 212B of the mounting boss part (e.g., 212), which is in contact with the top surface 110T of the outer frame 110, may be greater than the height of the bottom surface 210B of the cell stack 210, on the basis of the ground.

Hereinafter, an example of the second coupling part according to the concrete embodiment of the fuel cell will be described with reference to the accompanying drawings.

Figure 7:
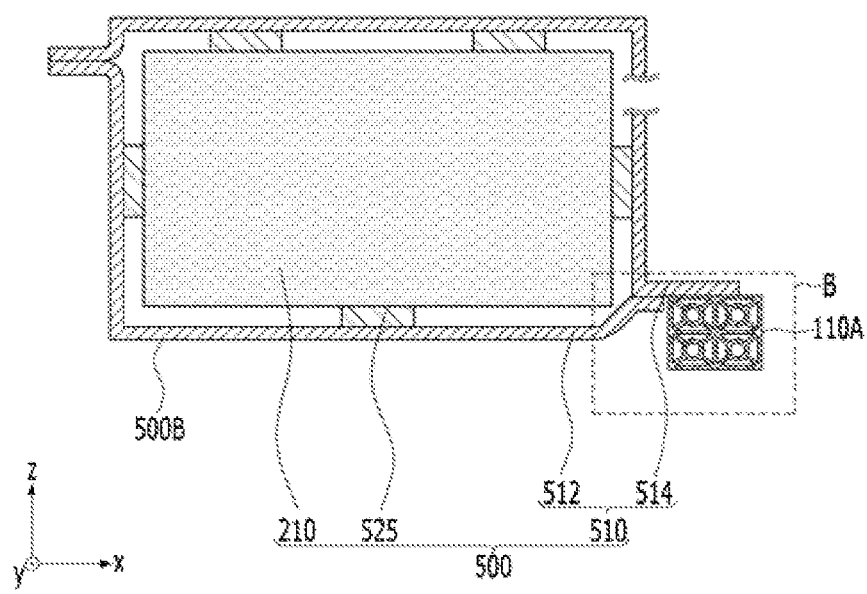
FIG. 7 is a cross-sectional view of an embodiment for explaining the coupling relationships between a fuel cell, including a cell stack as the upper structure, and an outer frame.
Figure 8:
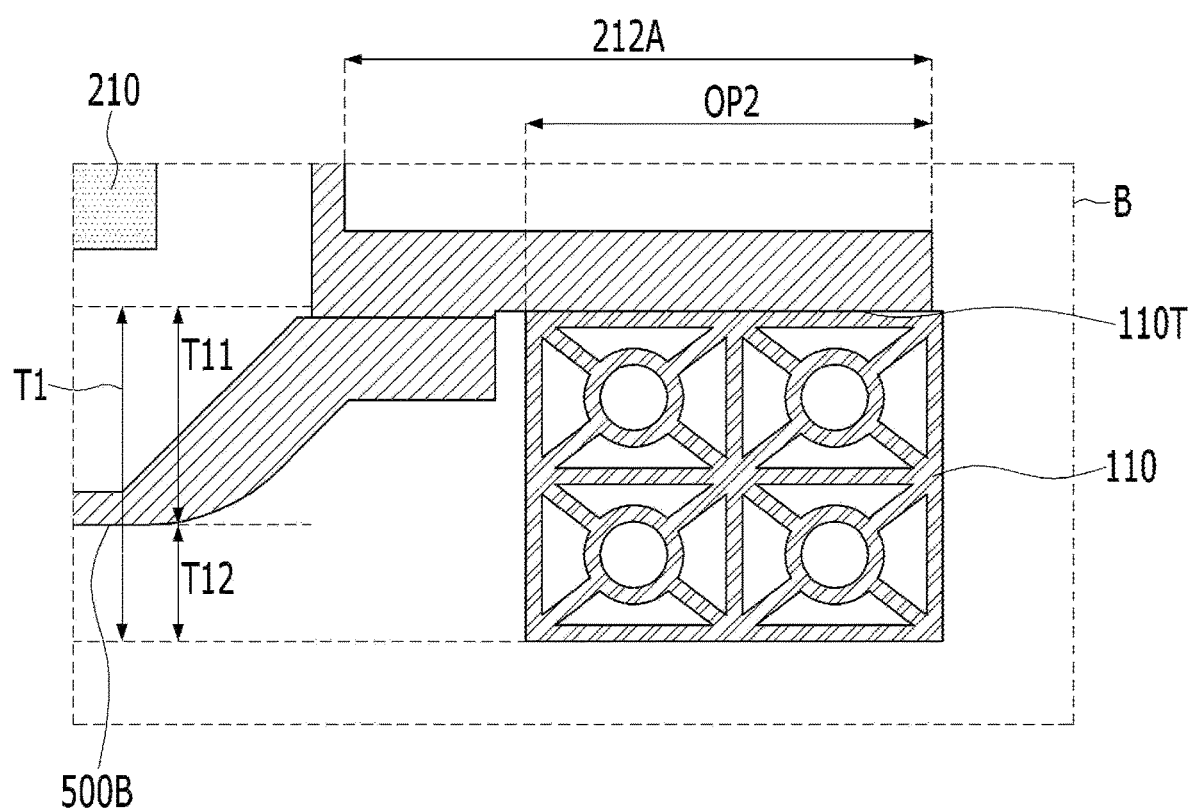
FIG. 8 is an enlarged cross-sectional view of portion B in FIG. 7.
Figure 9:
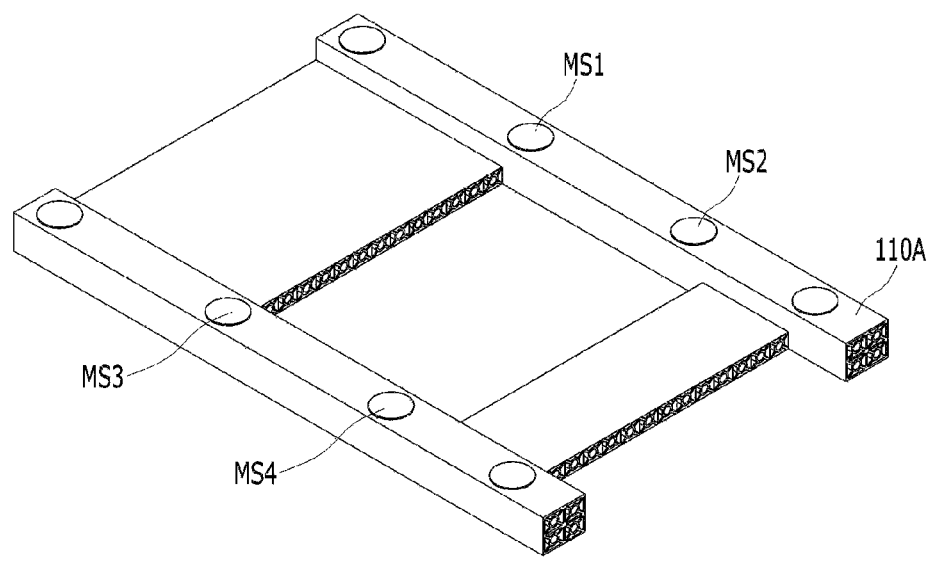
FIG. 9 is a perspective view of an outer frame according to an embodiment.

FIG. 7 is a cross-sectional view of an embodiment for explaining the coupling relationships between the fuel cell, including the cell stack 210 as the upper structure 200, and the outer frame 110 (110A), FIG. 8 is an enlarged cross-sectional view of portion B in FIG. 7, and FIG. 9 is a perspective view of the outer frame 110.

Referring to FIG. 7, the fuel cell 500 may include a cell stack 210, an enclosure 510, and an insulator 525.

The enclosure 510 may be disposed so as to surround the sides of the cell stack 210 to protect the cell stack 210. The enclosure 510 may be a four-sided enclosure, which exposes two opposite ends of the cell stack 210, or a five-sided enclosure, which surrounds any one of the two opposite ends of the cell stack 210 and the sides of the cell stack 210. In addition, the enclosure 510 may be formed such that at least two bodies 512 and 514 are coupled to each other. That is, as shown in FIG. 7, one 512 of the two bodies of the enclosure 510 may have an "L" shape, and the other one 514 of the two bodies may have a "¬" shape so as to be coupled to the "L" shaped body. Alternatively, unlike the configuration shown in FIG. 7, one of the two bodies of the enclosure 510 may have a "⊏" shape, and the other one of the two bodies may have a "-" shape so as to be coupled to the "⊏" shaped body. Alternatively, unlike the configuration shown in FIG. 7, the enclosure 510 may be formed in a unitary body.

The insulator 525 may cause the cell stack 210 and the enclosure 510 to be spaced a predetermined distance apart from each other and thus to be electrically insulated from each other.

In the case of the fuel cell shown in FIGS. 7 and 8, the mounting boss part 212A that corresponds to the second coupling part may have a shape that protrudes from the outer side surface of the enclosure 510. A portion OP2 of the mounting boss part 212A overlaps the outer frame 110 in the vertical direction. That is, as shown in FIG. 9, each of matching surfaces MS1, MS2, MS3 and MS4 between the mounting boss part 212A and the outer frame 110 may be located in the top surface 110T of the outer frame 110, and the mounting boss part 212A may be located on the side surface of the fuel cell 500, rather than on the bottom surface 500B of the fuel cell 500. In this case, the bottom surface 500B of the fuel cell 500 is located further downwards in the vertical direction than the matching surfaces MS1, MS2, MS3 and MS4. That is, the distance T11 between the top surface 110T (i.e., the matching surface) and the bottom surface 500B of the fuel cell 500 in the overall first thickness T1 of the outer frame 110 is excluded from the overall thickness MH1 of the fuel cell system 1000. That is, the overall thickness MH1 may be reduced by the thickness T11 of the outer frame 110.

Hereinafter, a method of manufacturing the above-described fuel cell frame 100 according to an embodiment will be described with reference to the accompanying drawings.

Figure 10A:
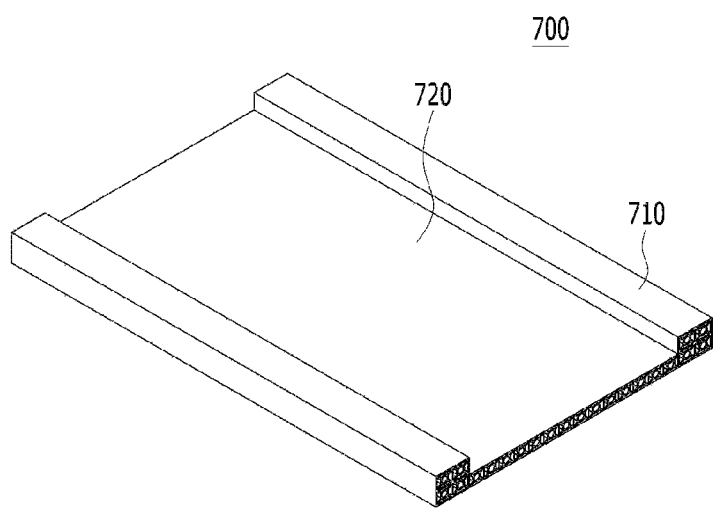
FIGS. 10A and 10B are perspective views showing the process of a method of manufacturing a fuel cell frame according to an embodiment.
Figure 10B:
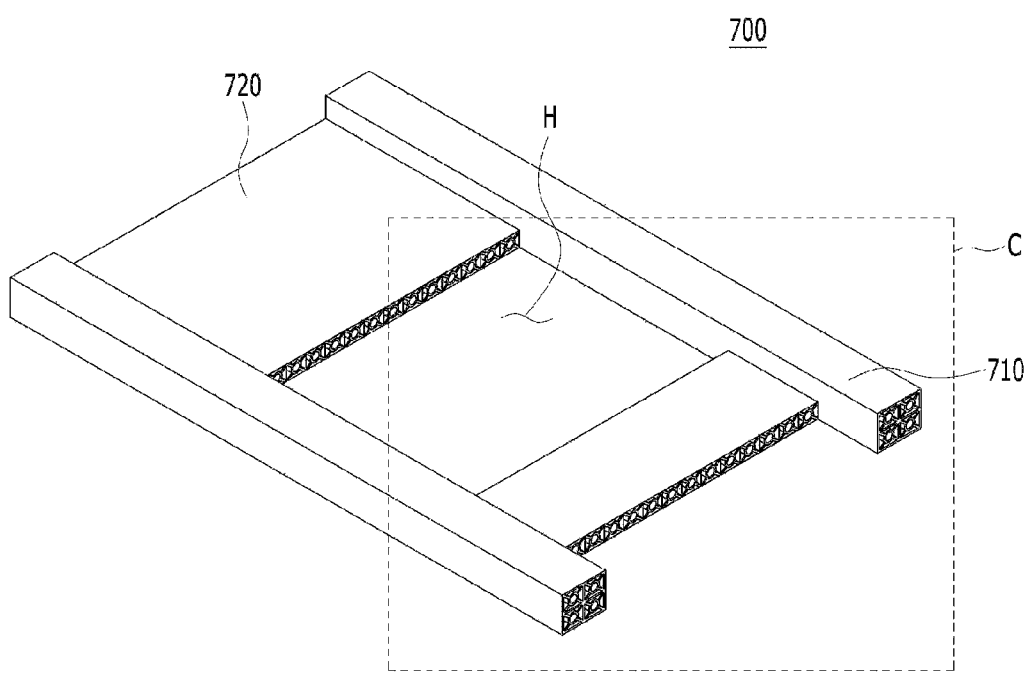
Figure 11:
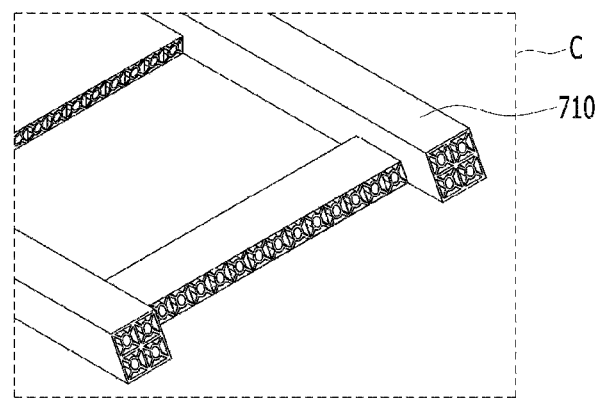
FIG. 11 is an enlarged perspective view of portion C in FIG. 10B.

FIGS. 10A and 10B are perspective views showing the process of the method of manufacturing the fuel cell frame 100 according to an embodiment, and FIG. 11 is an enlarged perspective view of portion C in FIG. 10B.

FIGS. 10A and 10B are views for explaining a method of manufacturing the fuel cell frame 100 in which the outer frame 110 and the inner frame 120 are integrated with each other.

First, a material 700 for manufacturing the fuel cell frame 100 is prepared, and an extrusion process is performed to form an outer frame 710 and an inner frame 720, which have a step therebetween, as shown in FIG. 10A. In this case, the section of the material for manufacturing the fuel cell frame 100 may have the honeycomb structure shown in FIGS. 11 and 3A.

Thereafter, the product shown in FIG. 10A may be cut to form a hollow H in the inner frame 720, as shown in FIG. 10B, thereby completing the formation of the fuel cell frame 100. That is, the outer frame 710 shown in FIG. 10B corresponds to the outer frame 110 described above, and the inner frame 720 shown in FIG. 10B corresponds to the inner frame 120 described above.

In addition, the outer frame 110 or the inner frame 120 of the fuel cell frame 100 may be manufactured through a high-vacuum die-casting process or a wide extrusion process.

Hereinafter, a fuel cell system 1 according to a comparative example and the fuel cell system 1000 according to the embodiment will be described with reference to the accompanying drawings.

Figure 12:
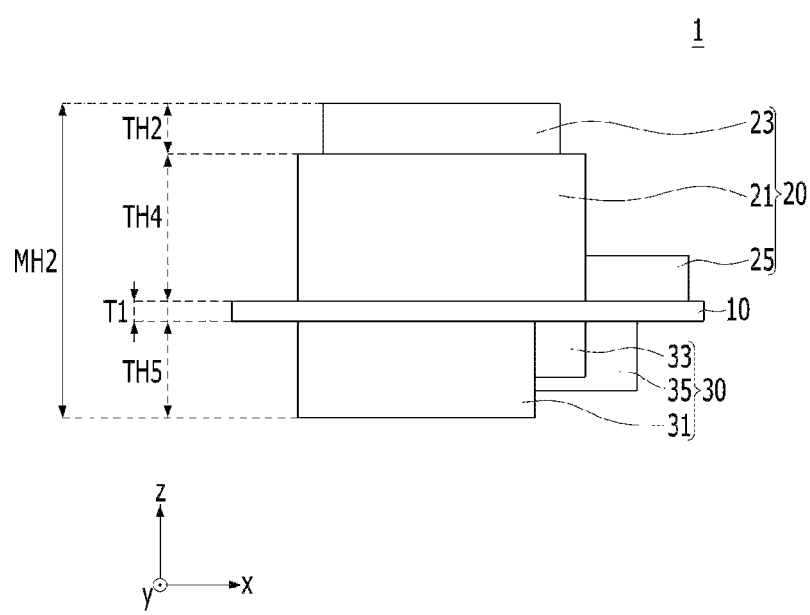
FIG. 12 is a front view of a fuel cell system according to a comparative example.

FIG. 12 is a front view of the fuel cell system 1 according to the comparative example.

The fuel cell system 1 according to the comparative example shown in FIG. 12 includes a fuel cell frame 10, an upper structure 20, and a lower structure 30. Here, the fuel cell frame 10, the upper structure 20, and the lower structure 3o perform the same functions as the fuel cell frame 100, the upper structure 200, and the lower structure 300 shown in FIG. 1C, respectively, and thus duplicate descriptions of these components 10, 20 and 30 will be omitted. In addition, the upper structure 20 according to the comparative example may include a cell stack 21, a high-voltage junction box 23, and a cooling pump 25. The lower structure 3o according to the comparative example may include a humidifier 31, an air compressor 33, and a drive motor 35. The cell stack 21, the high-voltage junction box 23, the cooling pump 25, the humidifier 31, the air compressor 33, and the drive motor 35 perform the same functions as the cell stack 210, the high-voltage junction box 220, the cooling pump 230, the humidifier 310, the air compressor 320, and the drive motor 330 shown in FIG. 1C, respectively, and thus duplicate descriptions of these components 21, 23, 25, 31, 33 and 35 will be omitted.

In the case of the fuel cell system 1 according to the comparative example, it is assumed that the fuel cell frame 10 has the first thickness T1, similarly to the outer frame 110 according to the embodiment. The cell stack 21 and the high-voltage junction box 23 are sequentially mounted on the fuel cell frame 10, and the humidifier 31 is mounted under the fuel cell frame 10. In the upper structures 20 mounted on the fuel cell frame 10, the thickness TH4 of the cell stack 21 and the thickness TH2 of the high-voltage junction box 23 are greater than the thickness of the cooling pump 25. In addition, in the lower structure 30 mounted under the fuel cell frame 10, the thickness TH5 of the humidifier 31 is greater than the thickness of the air compressor 33 or the drive motor 35. Thus, the overall thickness MH2 of the fuel cell system 1 according to the comparative example is equal to the sum of the first thickness T1 of the fuel cell frame 10, the thickness TH4 of the cell stack 21, the thickness TH2 of the high-voltage junction box 23, and the thickness TH5 of the humidifier 31, as expressed using Equation 1 below.

$$MH2 = T1 + TH2 + TH4 + TH5 \qquad \text{[Equation 1]}$$

On the other hand, the overall thickness MH1 of the fuel cell system according to the embodiment shown in FIG. 1C is equal to the sum of the first thickness T1 of the outer frame 110 of the fuel cell frame 100, the thickness TH1 of the cell stack 210 that protrudes above the outer frame 110, the thickness TH2 of the high-voltage junction box 220, and the thickness TH3 of the humidifier 310 that protrudes below the outer frame 110, as expressed using Equation 2 below.

$$MH1 = T1 + TH2 + TH1 + TH3 \qquad \text{[Equation 2]}$$

In Equations 1 and 2 above, TH1 is less than TH4, and TH3 is less than TH5. Specifically, in the case of the comparative example, the first thickness T1 of the fuel cell frame 10 is completely included in the overall thickness MH2 of the fuel cell system 1 without being reduced. On the other hand, in the case of the embodiment, as shown in FIG. 4, at least a portion of the lower end of the cell stack 210 and at least a portion of the upper end of the humidifier 310 may be received in the inner space HO of the outer frame 110.

For example, as shown in FIGS. 6A and 6B, when the mounting boss parts 212 to 218 are disposed as the second coupling part, the proportion occupied by the first thickness T1 of the fuel cell frame 100 in the overall thickness MH1 of the system moo, which is expressed using Equation 2 above, may be reduced. In particular, as shown in FIG. 6B, when the bottom surface 210B of the cell stack 210 is located in the same plane as the bottom surface 110B of the outer frame 110 or is located closer to the ground than the bottom surface 110B of the outer frame 110, the proportion occupied by the first thickness T1 of the fuel cell frame 100 in the overall thickness MH1 of the system 1000, which is expressed using Equation 2 above, may be zero.

Accordingly, it can be seen that the overall thickness MH1 of the fuel cell system 1000 according to the embodiment is less than the overall thickness MH2 of the fuel cell system 1 according to the comparative example. When the fuel cell vehicle according to the embodiment is a commercial vehicle such as a tram or a train, the overall height of the fuel cell system 1000 is a very important constraint when applying the fuel cell system 1000 to the fuel cell vehicle. In this respect, the fuel cell system 1000 according to the embodiment may be more useful for a commercial vehicle than the fuel cell system 1 according to the comparative example.

In the case of the fuel cell system 1 according to the comparative example, if the thickness of the fuel cell frame 10 is reduced, the rigidity required for the fuel cell frame 10 may be lowered. In order to secure the rigidity required for the fuel cell frame 10 while reducing the thickness thereof, if the interior of the fuel cell frame 10 is filled with a material having high rigidity, such as steel, or if the interior thickness of the fuel cell frame 10 is increased, the weight of the fuel cell system 1 may increase.

On the other hand, in the case of the fuel cell system 1000 according to the embodiment, the rigidity of the fuel cell frame 100 is secured by the outer frame 110 having a planar annular shape, and the second thickness T2 of the inner frame 120 is set to be less than the first thickness T1 such that a portion of the end of the upper structure 200 and a portion of the end of the lower structure 300 are inserted into the inner space HO of the outer frame 110. Nevertheless, in the fuel cell system 1000 according to the embodiment, the rigidity of the fuel cell frame 100 may be secured by the rigidity of the outer frame 110 so as to be as high as the rigidity of the fuel cell frame 10 according to the comparative example.

Figure 13:
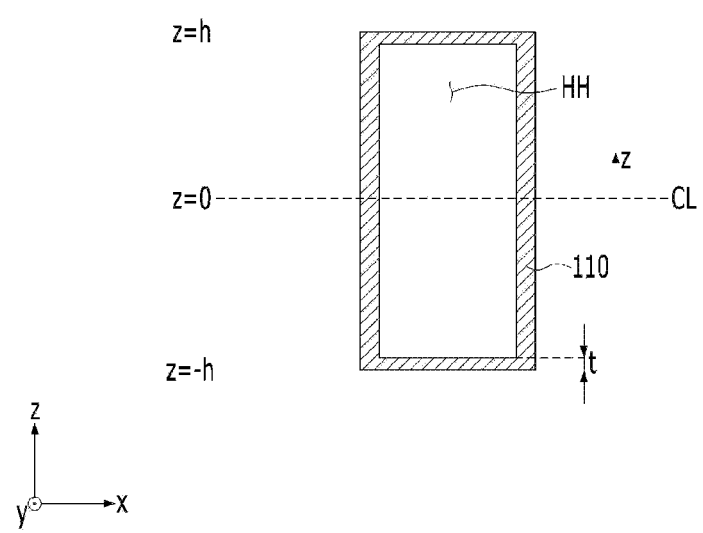
FIG. 13 is a plan view of the outer frame for explaining the rigidity of the fuel cell system according to the embodiment.

FIG. 13 is a plan view of the outer frame 110 for explaining the rigidity of the fuel cell system 1000 according to the embodiment. In FIG. 13, t denotes the thickness of a portion of the outer frame 110 that surrounds the hollow.

As shown in FIG. 13, when the section of the outer frame 110 has a hollow shape, the $2^{nd}$ moment of area I of the outer frame 110 may be expressed using Equation 3 below.

$$I = \int_{-h}^{h} z^2 dA \qquad \text{[Equation 3]}$$

Here, dA denotes a differential area (dxdz), and h denotes a contour dimension in the height direction.

The $2^{nd}$ moment of area in Equation 3 is a value obtained by integrating the square $z^2$ of the distance z from the center line CL to the differential area dA. Even when it is assumed that the rigidity of the fuel cell frame 100 according to the embodiment is secured only by the outer frame 110, if the section of the outer frame 110 has a hollow HH, as shown in FIGS. 13 and 3B, the $2^{nd}$ moment of area expressed using Equation 3 above may be maximized. Thus, even when the sectional thickness t of the outer frame 110 is reduced, it is possible to secure the rigidity of the outer frame 110 while reducing the weight thereof. Even when the section of the outer frame 110 has the honeycomb structure shown in FIG. 3A or the truss structure shown in FIG. 3C or 3D, the $2^{nd}$ moment of area may be maximized, and thus the rigidity of the outer frame 110 may be secured.

When the outer frame 110 according to the embodiment is made of aluminum, the weight of the fuel cell frame 100 may be reduced by about 20% compared to when the fuel cell frame 10 according to the comparative example is made of steel.

As a result, in the case of the fuel cell system 1000 according to the embodiment, it is possible to secure the rigidity of the fuel cell frame 100 while reducing or eliminating the portion occupied by the thickness of the fuel cell frame 100 in the overall thickness MH1 of the fuel cell system 1000 and reducing the weight of the fuel cell frame 100.

In addition, as shown in FIGS. 10A and 10B, when the outer frame 110 and the inner frame 120 of the fuel cell frame 100 are manufactured using an extrusion process, manufacturing costs may be reduced, and the weight of the fuel cell frame 100 may be reduced.

In addition, when the outer frame 110 of the fuel cell frame 100 is formed to have a hollow structure, as shown in FIG. 3B, through an aluminum hollow casting process, the weight of the fuel cell frame 100 may be further reduced.

In addition, when the outer frame 110 or the inner frame 120 of the fuel cell frame 100 is manufactured through a high-vacuum die-casting process, the freedom of molding may be maximized.

In addition, when the outer frame 110 or the inner frame 120 of the fuel cell frame 100 is manufactured through a wide extrusion process such that the section thereof has the truss structure shown in FIG. 3C or 3D or the honeycomb structure shown in FIG. 3A, the weight of the fuel cell frame 100 may be further reduced, and the manufacturing costs may be further reduced.

As is apparent from the above description, a fuel cell vehicle according to the embodiment includes a fuel cell system having a small thickness, high rigidity, and a low weight. The fuel cell system according to the embodiment is useful for a commercial vehicle, in which the overall height of the fuel cell system is a very important constraint. In addition, the manufacturing costs of the fuel cell system may be reduced, and the freedom of molding thereof may be maximized.

The above-described various embodiments may be combined with each other without departing from the objects of the present disclosure unless they are contrary to each other. In addition, for any element that is not described in detail of any of the various embodiments, reference may be made to the description of an element having the same reference numeral in another embodiment.

While the present disclosure has been particularly shown and described with reference to exemplary embodiments thereof, these embodiments are only proposed for illustrative purposes and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:

1. A fuel cell vehicle, comprising:
a fuel cell frame comprising an outer frame and an inner frame disposed inside the outer frame, wherein the inner frame is formed in a shape of a partition dividing an inner space surrounded by the outer frame into a plurality of hollows;
an upper structure disposed on the fuel cell frame; and
a lower structure disposed under the fuel cell frame,
wherein a first rigidity of the outer frame is greater than a second rigidity of the inner frame.

2. The fuel cell vehicle according to claim 1, wherein the outer frame has a planar annular shape surrounding a vertically projecting surface of a cell stack.

3. The fuel cell vehicle according to claim 1, wherein a first planar area of the inner space of the outer frame is greater than a second planar area of a vertically projecting surface of a cell stack.

4. The fuel cell vehicle according to claim 1, wherein a first thickness of the outer frame is greater than a second thickness of the inner frame in a vertical direction.

5. The fuel cell vehicle according to claim 1, wherein the outer frame and the inner frame are integrally formed with each other.

6. The fuel cell vehicle according to claim 1, wherein the outer frame and the inner frame are formed separately from each other.

7. The fuel cell vehicle according to claim 1, wherein the outer frame or the inner frame has a section having a hollow shape, a truss shape, or a honeycomb shape.

8. The fuel cell vehicle according to claim 1, wherein the outer frame or the inner frame comprises a first coupling part configured to be coupled to the upper structure or the lower structure; and
wherein the upper structure or the lower structure comprises a second coupling part configured to be coupled to the first coupling part.

9. The fuel cell vehicle according to claim 8, wherein the second coupling part comprises a mounting boss part protruding from an outer side surface of the upper structure such that at least a portion of the mounting boss part overlaps a top surface of the outer frame in a vertical direction.

10. The fuel cell vehicle according to claim 9, wherein a height of a bottom surface of the mounting boss part contacting the top surface of the outer frame is greater than a height of a bottom surface of the upper structure relative to a ground plane.

11. The fuel cell vehicle according to claim 9, wherein the upper structure comprises an enclosure protecting a cell stack, and wherein the mounting boss part protrudes from an outer side surface of the enclosure.

12. The fuel cell vehicle according to claim 1, wherein a height of a top surface of the outer frame is greater than a height of a bottom surface of the upper structure relative to a ground plane.

13. The fuel cell vehicle according to claim 1, wherein the inner frame comprises a step formed thereon.

14. The fuel cell vehicle according to claim 13, wherein the inner frame comprises:

a first portion on which the upper structure is mounted; and a second portion under which the lower structure is mounted, the second portion having a height greater than a height of the first portion relative to a ground plane, wherein the step is formed between the first portion and the second portion.

15. The fuel cell vehicle according to claim 14, wherein a bottom surface of the upper structure mounted on the first portion is located in a same horizontal plane as a top surface of the lower structure mounted under the second portion relative to the ground plane.

16. The fuel cell vehicle according to claim 14, wherein a bottom surface of the upper structure mounted on the first portion is lower than a top surface of the lower structure mounted under the second portion relative to the ground plane.

17. The fuel cell vehicle according to claim 14, wherein a portion of the upper structure mounted on the first portion and a portion of the lower structure mounted under the second portion overlap each other in a horizontal direction.

18. The fuel cell vehicle according to claim 1, wherein a hollow of the plurality of hollows has a size such that a portion of an end of the upper structure or the lower structure is inserted therein.

19. The fuel cell vehicle according to claim 1, wherein the upper structure comprises a cell stack, a high-voltage junction box, or a cooling pump; and wherein the lower structure comprises a humidifier, an air compressor, or a drive motor.

* * * * *